(12) United States Patent
Scherrer (10) Patent No.: US 9,524,294 B2
(45) Date of Patent: Dec. 20, 2016

(54) CIRCUITRY FOR A COMMENTATOR AND/OR SIMULTANEOUS TRANSLATOR SYSTEM, OPERATING UNIT AND COMMENTATOR AND/OR SIMULTANEOUS TRANSLATOR SYSTEM

(71) Applicant: INSTITUT FUR RUNDFUNKTECHNIK GMBH, Munich (DE)

(72) Inventor: Volker Scherrer, Floersheim am Mein (DE)

(73) Assignee: Institut fur Rundfunktechnik GMBH, Munich (DE)

( * ) Notice: Subject to any disclaimer, the term of this patent is extended or adjusted under 35 U.S.C. 154(b) by 63 days.

(21) Appl. No.: 14/683,464

(22) Filed: Apr. 10, 2015

(65) Prior Publication Data
US 2015/0293909 A1 Oct. 15, 2015

(30) Foreign Application Priority Data
Apr. 10, 2014 (IT) .............................. MI2014A0677

(51) Int. Cl.
| | | |
|---|---|---|
| *G06F 17/28* | (2006.01) | |
| *G10L 25/48* | (2013.01) | |
| *H04H 20/61* | (2008.01) | |
| *H04H 20/86* | (2008.01) | |
| *H04R 1/10* | (2006.01) | |
| *H04H 60/04* | (2008.01) | |

(52) U.S. Cl.
CPC ............. *G06F 17/289* (2013.01); *G10L 25/48* (2013.01); *H04H 20/61* (2013.01); *H04H 20/86* (2013.01); *H04H 60/04* (2013.01); *H04R 1/1091* (2013.01)

(58) Field of Classification Search
USPC ........................... 307/135; 379/159; 348/192
See application file for complete search history.

(56) References Cited

U.S. PATENT DOCUMENTS

| | | | | |
|---|---|---|---|---|
| 4,660,107 A | * | 4/1987 | Chippendale, Jr. .. | G11B 27/024 340/309.16 |
| 7,617,445 B1 | * | 11/2009 | Townsend ............. | G06F 17/241 715/201 |
| 2002/0161579 A1 | * | 10/2002 | Saindon .................. | G06F 17/28 704/235 |
| 2003/0100259 A1 | * | 5/2003 | Sinclair .................. | H04H 20/02 455/3.01 |

(Continued)

FOREIGN PATENT DOCUMENTS

| | | |
|---|---|---|
| DE | 35 10 477 A1 | 9/1985 |
| EP | 2 139 114 A1 | 12/2009 |

(Continued)

OTHER PUBLICATIONS

Italian Search Report dated Sep. 15, 2015, issued in Italian Application No. TO2014A000667, filed Apr. 10, 2014.

*Primary Examiner* — Duc Nguyen
*Assistant Examiner* — Yogeshkumar Patel
(74) *Attorney, Agent, or Firm* — Workman Nydegger (57) ABSTRACT

A commentator or simultaneous translator system is provided with an audio mixing console, a command intercom and an operating unit. The operating unit is provided with a circuitry. The operating unit is implemented in such a way that a simplified operation of the commentator or simultaneous translator system is provided.

25 Claims, 3 Drawing Sheets

(56) References Cited

U.S. PATENT DOCUMENTS

| | | | |
|---|---|---|---|
| 2004/0080528 A1* | 4/2004 | Rand | G06F 17/30017 715/738 |
| 2004/0167784 A1* | 8/2004 | Travieso | G06F 17/289 704/270.1 |
| 2004/0212681 A1* | 10/2004 | Cho | H04H 60/04 348/192 |
| 2005/0106536 A1* | 5/2005 | Liebermann | G09B 21/04 434/112 |
| 2006/0116073 A1* | 6/2006 | Richenstein | H04H 20/62 455/3.06 |
| 2007/0242834 A1* | 10/2007 | Coutinho | G10K 11/1788 381/71.8 |
| 2008/0318518 A1* | 12/2008 | Coutinho | H04H 20/62 455/3.06 |
| 2009/0315410 A1* | 12/2009 | Tyrrell | H03K 5/1254 307/135 |
| 2010/0284545 A1* | 11/2010 | Dietz | H04R 5/027 381/58 |
| 2012/0023408 A1* | 1/2012 | Lordan | H04N 21/4882 715/733 |
| 2012/0023520 A1* | 1/2012 | Lordan | G06F 17/30029 725/32 |
| 2012/0023521 A1* | 1/2012 | Lordan | H04N 21/4755 725/35 |
| 2012/0066594 A1* | 3/2012 | Gavade | H04N 21/2743 715/716 |
| 2012/0268553 A1* | 10/2012 | Talukder | H04L 12/1818 348/14.08 |
| 2012/0282884 A1* | 11/2012 | Sun | H04M 11/04 455/404.2 |
| 2014/0024332 A1* | 1/2014 | Droste | H04L 12/1895 455/404.2 |
| 2014/0162241 A1* | 6/2014 | Morgia | G06Q 30/02 434/362 |
| 2015/0098018 A1* | 4/2015 | Starling | H04N 7/0882 348/468 |
| 2016/0117903 A1* | 4/2016 | Striemer | G08B 21/0205 340/457 |

FOREIGN PATENT DOCUMENTS

| | | | | |
|---|---|---|---|---|
| HU | DE 3510477 A1 * | 9/1985 | | G09B 5/00 |
| WO | 03/026172 A1 | 3/2003 | | |

* cited by examiner

CIRCUITRY FOR A COMMENTATOR AND/OR SIMULTANEOUS TRANSLATOR SYSTEM, OPERATING UNIT AND COMMENTATOR AND/OR SIMULTANEOUS TRANSLATOR SYSTEM

CROSS-REFERENCE TO RELATED APPLICATIONS

This application claims priority to Italian Application No. MI2014A000677, filed Apr. 10, 2014, which application is hereby incorporated by reference.

BACKGROUND OF THE INVENTION

The invention relates to a circuitry according to the preamble of claim 1. The invention also relates to an operating unit provided with the circuitry and to a commentator and/or simultaneous translator system provided with said operating unit.

In live broadcasts, commentators have the task to provide the television viewer with further information about the events. Commentators may have their booth either on-site (e.g., in the stadium) or in the broadcasting center.

Figure 1:
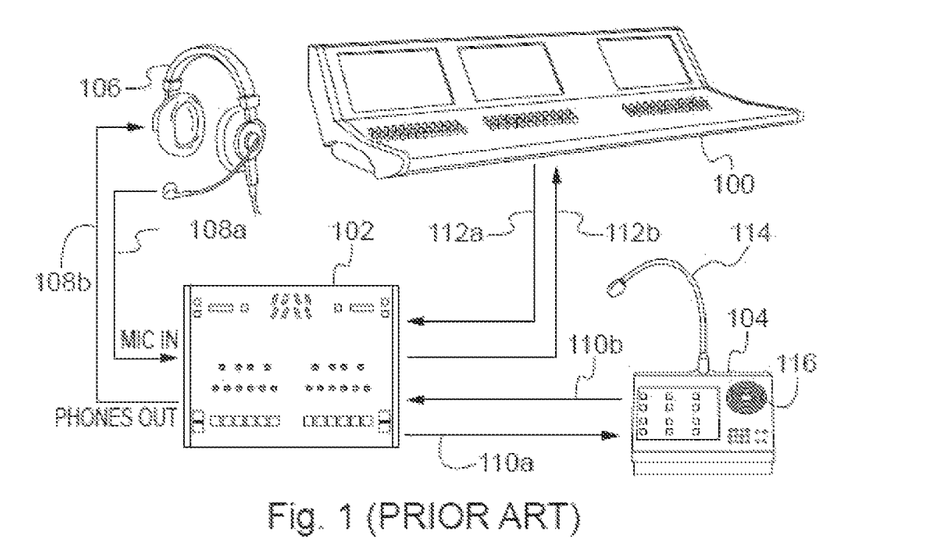
FIG. 1 is a commentator/simultaneous translator system according to prior art.

A known commentator and/or simultaneous translator system is depicted in FIG. 1 and is explained in the following. The system shown in FIG. 1 can be arranged in a studio and is used by the commentators, for live speakers and for simultaneous translations for foreign-language studio guests. In general, there, a so called commentator unit is used for their tasks.

Hence, FIG. 1 shows a commentator and/or simultaneous translator system provided with a preferably digital audio mixing console 100, a commentator unit 102 and a command intercom 104. Furthermore, a headphone/microphone unit 106 is shown which can be worn on the head by the commentator or the simultaneous translator.

The headphone/microphone unit 106 is connectable to the commentator unit 102 by means of the lines 108a, 108b. The commentator intercom 104 is connectable to the commentator unit 102 by means of the lines 110a, 110b. The commentator intercom 104 is provided with a microphone 114 and a speaker 116. The commentator unit 102 is coupled with the audio mixing console 100 by means of the lines 112a, 112b.

The mixing console 100 is operated by the audio engineer in the audio control room. Such a room could be in a broadcast vehicle or in a steady broadcasting center. The commentator unit 102 has the task to pre-amplify the microphone of the interpreter, to finalize the necessary audio signals for audio monitoring, to emit the interpreter signals and the commentator signals as transmission audio signal, to indicate and emit the necessary command signals to the command intercoms, and to realize the overplugging of the broadcast routes. The command intercom 104 establishes communication between all persons involved in the broadcasting.

Via line 112a, signals are transmitted from the mixing console to the commentator unit 102. This relates to audio monitoring routes and prefade listening routes.

Via line 112b, signals are transmitted from the command intercom 104 to the mixing console 100. Thereby, it is e.g., about the transmission signal.

Via line 110b, signals are fed from the command intercom 104 to the commentator unit 102. This relates to the communication to all persons involved in the broadcasting.

Via line 110a, signals are fed from the command intercom 104. This relates to the communication to all persons involved in the broadcasting.

The commentator unit and the command intercom, as well as the microphone for the interpreter/commentator is situated in the OFF-voice-over room (a small studio room).

The classic use of the known commentator and/or simultaneous translator system bears the disadvantage that all audio parameter settings for the commentators and simultaneous translators have to be pre-set on said commentator unit 102, and cannot be changed from the audio direction during the broadcasting. A further disadvantage is the quite elaborate connection and the extensive studio communication to the commentator unit. The necessary configuration corresponding to the production has to be adjusted by re-wiring.

BRIEF DESCRIPTION OF THE INVENTION

The technical object is to simplify the commentators' connection, to remedy the disadvantages described above and to optimize the operating procedures.

According to the invention, an operating unit is provided, and the circuitry for this operating unit is characterized according to the characterizing features of claim 1. Preferred further embodiments of the circuitry are characterized by the claims 2 to 14. The commentator and/or simultaneous translator system according to the invention is characterized according to claim 17. Preferred further embodiments of the commentator and/or simultaneous translator system are characterized by the claims 18 to 22.

The microphone in the OFF-voice-over room is directly fed to a microphone input of the mixing console. The necessary import routes (the necessary prefade listening and audio monitoring routes) are fed from the mixing console to the command intercom e.g., by means of fiberglass. The broadcast route overplugging of the interpreter/the commentators is realized with an operating unit which is provided with the circuitry according to the invention. Said operating unit is passive (is supplied with voltage by the command intercom) directly connected to the command intercom.

The advantages of the implementations according to the invention are the following:

- The costs are significantly reduced, since each a commentator unit of approx. 5000 EUR is not required and only one operating unit, provided with the circuitry according to the invention, for approx. 600 EUR is connected to the existing command intercom.
- Here, the cable wiring to be installed is further significantly reduced, which comes with great cost savings and time saving.
- The audio engineer has the possibility to access to all audio parameters of the commentator and if necessary can change them during production.
- The high quality OFF room microphone as well as the microphone of the headphone unit of the commentator/interpreter can be used.
- The communication to all persons involved in the broadcasting and audio monitoring routes and the overplugging of the broadcast routes of the interpreter/commentator is significantly simplified.
- Operation for the commentator/simultaneous translator is significantly simplified and clear.
- Operation for the studio staff (set-up/dismantling) is significantly reduced.

A commentator booth can be very quickly set-up with every command intercom in the studio area and an operating unit, as wells as a microphone.

It should be noted that EP 2139114A discloses an ultra-low current pushbutton switch interface circuit to achieve a switch interface circuit for an SPST momentary pushbutton switch. It is submitted however that the known circuit differs significantly from the circuit arrangement claimed, in that the circuit arrangement as claimed is more than simply twice the known interface circuit, but includes additional features, such as a cross coupling between the two circuits, which is not disclosed in EP 21399114A and for which the skilled man cannot find an incentive in EP 2139114A either.

If should further be noted that WO03/026172 discloses an intelligent broadcasting control system designed for broadcasting in a single building, such as office buildings or hotels. The main object of the system described in the document is to enable broadcasting of messages, more specifically alarm messages in the building. The system known from WO03/026172 has no relation whatsoever with a commentator and/or simultaneous translator arrangement as proposed in the present invention. Neither does WO03/026172 disclose a circuit arrangement and a control unit comprising the circuit arrangement as proposed in the present invention.

In so far the element 180 in WO03/026172 could be equated to the control unit claimed, it should be stressed that the connecting lines between element 180 and element 100 (see FIG. 1 in WO03/026172) audio lines are present, contrary to the present invention.

BRIEF DESCRIPTION OF THE FIGURES

The invention is explained in more detail by means of the description of the figures below. It shows

DETAILED DESCRIPTION OF THE FIGURES

Figure 2:
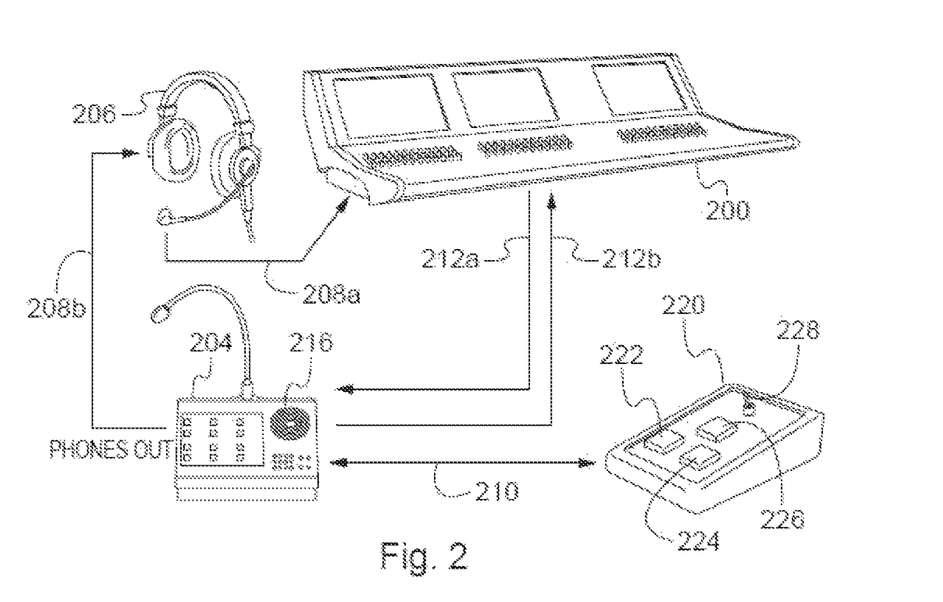
FIG. 2 is an exemplary embodiment of a commentator/simultaneous translator system according to the invention.

FIG. 2 shows an exemplary embodiment of a commentator/simultaneous translator system according to the invention.

Hence, FIG. 2 shows a commentator and/or simultaneous translator system provided with a preferably digital audio mixing console 200, a command intercom 204 and an control module 220. Further, a headphone/microphone unit 206 is shown which can be worn on the head by the commentator or simultaneous translator.

The headphone/microphone unit 206 is connectable to the command intercom 204 by means of line 208b and connectable to a microphone input of the mixing console 200 by means of line 208a. The command intercom 204 is connectable to the control module 220 by means of the connection line 210. The command intercom 204 is provided with a microphone 214 and a speaker 216. The command intercom 204 is coupled with the audio mixing console 200 by means of lines 212a, 212b.

Via line 212a, signals are transmitted from the mixing console 200 to the command intercom 204. This relates to signals such as prefade listening routes, audio monitoring routes, as well as broadcast routes.

Via line 212b, signals are transmitted from the command intercom 204 to the mixing console 200. This relates to broadcast routes.

Via the connection 210, signals are exchanged between the command intercom 204 and the control module 220. This relates to the control and power lines, as will be explained later.

The control module 220 contains two transmit buttons (actuating units) 222 and 224, a mute button 226 as well as a mode-switching switch (interpreter/commentator mode) 228.

The microphone broadcast routes of the commentator/interpreter are automatically muted (set mute) during emission of commands of the command intercom. So, it is prevented, that e.g., information from the commentator for the editor or audio engineer are heard by the viewer. All audio sources required by the commentator/interpreter are addressable on the command intercom 204 and individually adjustable in their volume. When using two headsets for two commentators at one intercom, the commentators, as needed, can hear each other, wherein the headset volume can be adjusted on the operating unit as well as in the command intercom.

The control module 220 contains a circuitry.

Figure 3:
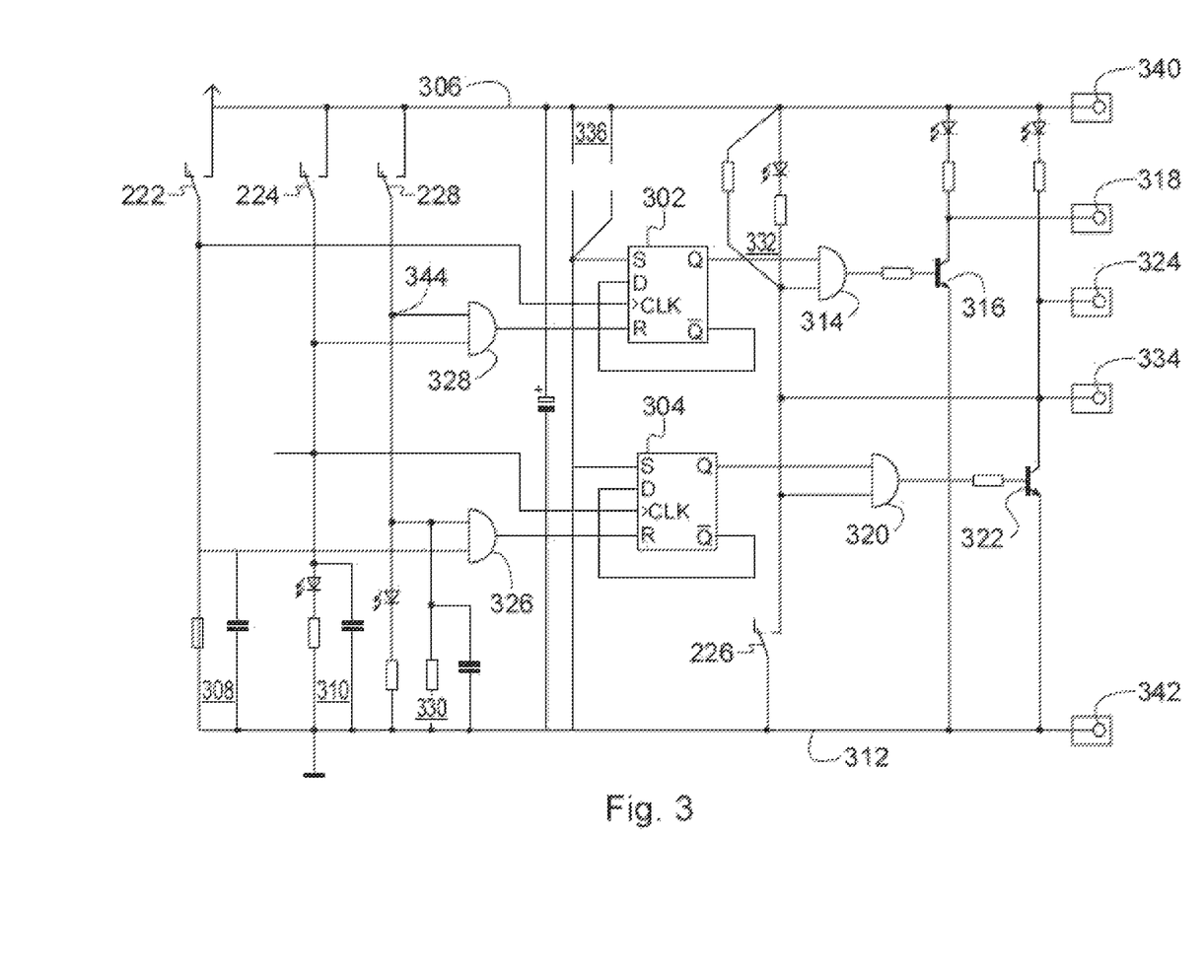
FIG. 3 is an exemplary embodiment of a circuitry according to the invention for the operating unit.

FIG. 3 shows an exemplary embodiment of such a circuitry.

The circuitry contains a first logical switching unit 302 and a second logical switching unit 304, in this exemplary embodiment both are in form of a S-R flip-flop. First and second actuating units (the aforementioned transmit buttons) 222 and 224 are provided, with each a first terminal coupled with a second power line 306 (e.g., +5 Volts) and each with a second terminal which is coupled with a second power line 312 (e.g., zero Volt) via respective impedances 308 (R1, C1) or 310 (R2, C2).

The second terminal of the first actuation unit 222 is furthermore coupled with a first control input (the Clock-input CLK) of the first logical switching unit 302. The second terminal of the second actuating unit 224 is furthermore coupled with a first control input (the Clock-input CLK) of the second logical switching unit 304.

A first output (the Q-output) of the first logical switching unit 302 is, via a logic combination unit 314 (in this case in form of an AND-gate) and a first semiconductor element 316 (in this case in form of a NPN transistor), coupled with a first output 318. A first output (the Q-output) of the second logical switching unit 304 is, via a logic combination unit 320 (in this case in form of an AND-gate) and a second semiconductor element 322 (in this case in form of a NPN transistor), coupled with a second outlet 324.

The second terminal of the first actuating unit 222 is furthermore, via a logic combination unit 326 (in form of an AND-gate) coupled with a second control input (the R-input) of the second logical switching unit 304. The second terminal of the second actuating unit 224 is furthermore, via a logic combination unit 328 (in form of an AND-gate), coupled with a second control input (the R-input) of the first logical switching unit 302.

The circuitry is further provided with a third actuating unit 228. A first terminal of the third actuating unit 228 is coupled with a first power line 306 and the second terminal of the third actuating unit 228 is, via an impedance circuit 330, coupled with the second power line 312. Furthermore, the second terminal of the third actuating unit 228 is coupled with second inputs of the logic combination units 326 and 328.

A fourth actuating unit 226 is provided, having a first terminal coupled with a third output 334, with second inputs of the logic combination units 314 and 320, and coupled via a impedance circuit 332 with the first power line 306. The second terminal is coupled with the second power line 312.

Further, the S-inputs of the logic circuit units 302 and 304 are coupled with the second power line 312, and, via an impedance circuit 336, with the first power line 306. The Q-outputs of the circuit units 302 and 304 are coupled with their own D-inputs.

The feed lines 306 and 312 are connected with the terminals 340 and 342. The terminals 318, 324, 334, 340 and 342 hence form connection terminals of the circuitry with the connection 210, and thus with the command intercom. As can be seen, the connection 210 avoids audio transmission lines. Also, it hence can be seen, that feeding of the circuitry is realized from the command intercom. All this implies a simple control connection between the control module 220 and the intercom 204.

The principle of operation of the circuitry according to the invention is as follows.

In the shown position of the actuating unit 228, which operates as the mode button, the system is in interpreter mode. In the closed position of the actuating unit 228, the system is in the commentator mode.

A single actuation of the actuating unit 222 by the interpreter will change the signal at the output 318 form 'logic low' (0 Volt) into 'logic high' (5 Volts). The signal at the output 324 stays 'logic low' (0 Volt). If the output 324 was logic high, is becomes logic low.

At repeated actuation of the actuating unit 222 will change the signal on the output 218 from 'logic high' (5 Volts) in turn into 'logic low' (0 Volts). The signal at the output 324 stays 'logic low' (0 Volts).

A single actuation of the actuating unit 224 will change the signal at the output 324 from 'logic low' (0 Volt) into 'logic high' (5 Volts). The signal at the output 318 stays 'logic low' (0 Volt).

A repeated actuation of the actuating unit 224 will change the signal at the output 324 in turn from 'logic high' (5 Volts) into 'logic low' (0 Volt). The signal at the output 218 stays 'logic low' (0 Volt).

In all these cases, wherein one of the outputs 318, 324 is 'logic high', and the actuating unit 226 is (temporarily) pushed, the outlet which is 'logic high' becomes (temporarily) 'logic low'. Also, the signal on the output 334 becomes 'logic low'. The actuating unit 226 is the mute button, and is (temporarily) pushed if, e.g., in commentator mode, two commentators are present and have to discuss something with each other which is not meant for the television viewers. By pushing the mute button 226, the emitted signals are hence interrupted.

If the mode button 228 is operated in the other than the position shown (hence in the commentator mode), at first instance, noting is changed on the output signals at the outputs 318, 324 and 334.

A single actuation of the actuating units 222 will change the signal at the output 318 from 'logic low' (0 Volt) to 'logic high' (5 Volts). The signal at the output 324 stays 'logic low' (0 Volt).

If the actuating unit 224 is actuated, the signal at the output 324 changes from 'logic low' (0 Volt) into 'logic high' (5 Volts). The signal at the output 318 now changes from 'logic high' (5 Volts) into 'logic low' (0 Volt).

If the actuating unit 222 is actuated again, the signal at the output 318 in turn changes from 'logic low' (0 Volt) into 'logic high' (5 Volts). The signal at the output 324 changes from 'logic high' (5 Volts) into 'logic low' (0 Volt).

If the actuating unit 222 is actuated again, the signal output at output 318 again switches to 'logic low' (0 Volt).

Now, a description of the interpreter mode and the commentator mode follows.

In the simultaneous translator mode, the conversation between the interviewer (Mister X) and the person to be interviewed (Mister Y) is translated for German television. Mister Y only speaks English. And he has an in-ear-headphone/receiver in the ear. The interview by means of the simultaneous translator system according to FIGS. 2 and 3 proceeds as follows. The mode button is hence in the (open) position shown in FIG. 3. The interviewer asks Mister Y a question in German, such as e.g., "Herzlich willkommen, Herr Y, in unserem Studio. Vielen Dank, dass Sie für uns die Zeit genommen habe, um uns mit einem Besuch zu verehren". The interpreter hears this sentence via his headphones 206, temporarily pushes the button 222 and starts translating this sentence into English. "Welcome, Mr. Y, in our studio. Thank you for taking the time to visit us". In that the interpreter pushed the button 222 temporarily, the output signal at the terminal 318 becomes 'logic high', as already stated above. Under influence of this 'logic high' control signal at the terminal 318, a connection in the command intercom 204 is established between the microphone of the interpreter and the speaker of the in-ear headphones of Mister Y. Hence, Mister Y can understand this sentence translated into English. After the interpreter finished the sentence translated into German, he again pushes the button 222, so that the signal at the terminal 318 becomes 'logic low' again. In response, the audio connection between the microphone of the interpreter and the speaker in the in-ear headphones of Mister Y is interrupted in the command intercom.

Mister Y now answers in English: "Thank you, Mr. X. I enjoy being here". The interpreter hears this sentence via his headphones 206, pushes the button 224 temporarily and starts translating this sentence into German for the German television viewers. "Danke, Herr X, ich freue mich hier zu sein". In that the interpreter pushes the button 224, as described above, the output signal at the terminal 324 becomes 'logic high'. Under influence of this 'logic high' control signal at the terminal 324, a connection in the command intercom 204 is established between the microphone of the interpreter and an outgoing line for the broadcast of the interview. Hence, the German television viewers can understand this sentence translated into German. After the interpreter has finished the answer translated into German, he again pushes the button 224 temporarily, so that the signal at the terminal 324 becomes 'logic low' again. In response, the audio connection between the microphone and the outgoing audio connection for the television viewers is interrupted in the command intercom.

This procedure is repeated again and again, if the interviewer asks a question in German to Mister Y, and Mister Y answers in English.

It might e.g., happen that the interpreter wants to discuss something with the audio engineer or with the direction, what is not meant for Mister Y or the television viewers. The interpreter then pushes a request button on the command intercom 204, so that an audio connection between the interpreter and the audio engineer or the direction can be established, and furthermore the connection of the microphone of the interpreter with the speaker of the in-ear headphone of Mister Y and the output line for the German television viewers are interrupted. By pushing the record button on the command intercom 204, a mute signal is automatically produced by this command intercom, which is fed via a mute line in the connection 210 to the terminal 334. This will be explained later in greater detail on the basis of FIG. 4.

In the commentator mode, e.g., a football match is moderated by two commentators.

The first commentator temporarily pushes the button 224 (FIG. 2), whereby the switch 222 (FIG. 3) is temporarily closed. Thus, the signal at the terminal 318 becomes 'logic high'. Under influence of that 'logic high' control signal at the terminal 318, which is fed via the connection 210 to the command intercom, in the command intercom, a connection is established between the microphone of the first commentator and the outgoing audio connection for the broadcast to the televisions. Thus, the television viewers can understand the comment of the first commentator. When the second commentator takes over the comment of the football match, the first commentator pushes his button 222 (the signal at the terminal 318 becomes 'logic low'), so that his microphone is switched off, and the second commentator pushes the button 224 (the signal at the terminal 324 becomes 'logic high'), so that his microphone is switched on.

However, it might happen that if one of the two persons in the commentator room is switched on, and the other person in the commentator room is switched off, both have a contribution for the commentary, e.g., in case the first person is a commentator and the second person is a football expert. The first person (the commentator) commends the football match (hence the output signal at the terminal 318 is 'logic high' and the output signal at the terminal 324 is 'logic low'), and the commentator requests the expert for an additional comment. The expert then pushes the button 224, so that the output signal at the terminal 324 also becomes 'logic high'. Thus, the microphone of the expert is also switched on, so that the television viewers can hear both the comment of the commentator and the comment of the expert.

It should be mentioned that above, a circuit was described which is used both in simultaneous translator mode and in commentator mode. If switch 228 was missing and replaced by a permanent electrical connection, the circuit would only be useful for a commentator system. If switch 228 were missing, hence the circuit point 334 were not connected to the power line 305, the circuit would only be useful for an interpreter system.

Figure 4:
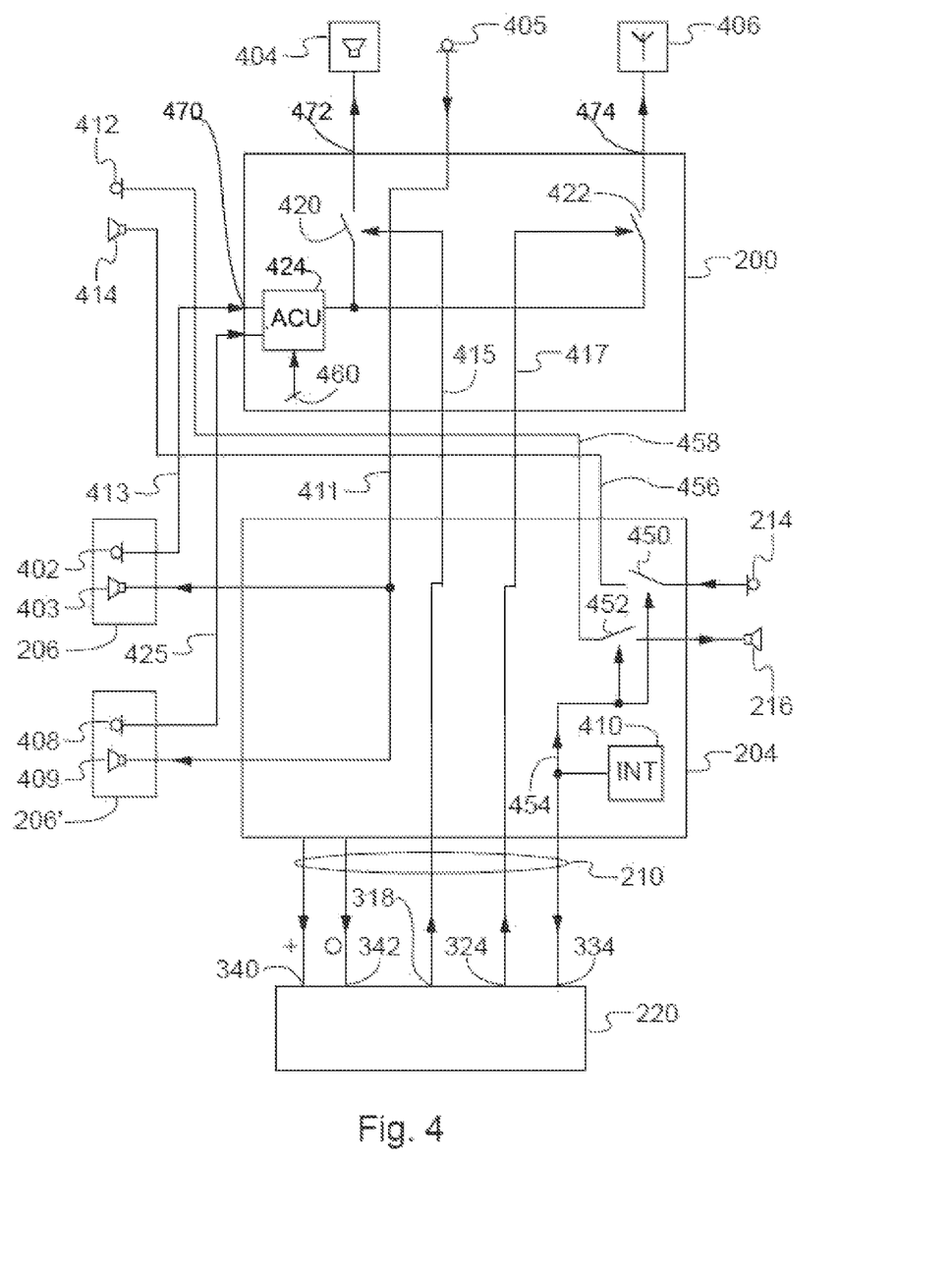
FIG. 4 is in greater detail the circuit connections between mixing console, command intercom and operating unit.

FIG. 4 shows in more detail the different signal connections between control module 220, command intercom 204 and mixing console 200 for realizing a simultaneous translator system or a commentator system.

With 206 in FIG. 4, the headphone/microphone unit of the interpreter is implied, provided with a microphone 402 and a speaker 203. The first commentator for a commentator system can also use this headphone/microphone unit 206. For the second commentator, a second headphone/microphone unit 206' is allocated, also provided with a microphone 408 and a speaker 209. The interviewer has a microphone 405 and the person who is being interviewed has an in-ear headphone/speaker 404.

The questions of the interviewer or the answers of the person to be interviewed are fed from the microphone 405 via the line 411 to the speakers 403 and 409. The translation of the question of the interviewer by the interpreter is fed from the microphone 402 via the line 413, via an input terminal 470 of the mixing console 200, to the audio control unit (ACU) 424, and via the switch 420 (which is under influence of the control signal on the line 415 in a closed position) to an output terminal 472 of the mixing console 200, and then to the in-ear headphone of the person to be interviewed. The switch 422 is now in the open position and under influence of the control signal of the line 417.

The translated answer of the person to be interviewed by the interpreter is fed from the microphone 402 via the line 413, to the audio control unit (ACU) 424, and via the switch 422 (which is under influence of the control signal on the line 417 in a closed position) to an output terminal 474 of the mixing console 200, and then to the transmission antenna 406. The switch 420 now is in the open position under influence of the control signal on the line 415.

Now, the principle of operation is described if two commentators are present for commenting of e.g., a football match. The first commentator uses the headphone/microphone unit 206 and the second commentator (the expert) uses the headphone/microphone unit 206'. Normally, the first commentator comments the match via the microphone 402. The commentary is fed from the microphone 402, via the line 413, the ACU unit 424 and the (closed) switch 422 to the transmission antenna 406.

If the second commentator switches himself on (by pushing the button 224, see FIG. 3), in the ACU unit 424, also the second comment is switched on. This is realized by feeding a control signal to the ACU unit 424 via a control signal input terminal 460. This control signal is substantially derived from control signals to the outputs 318 and 324. Thus, it is achieved that the second commentary is also fed via the line 425, the ACU unit 424 and the closed switch 422 to the transmission antenna 406.

Now, the principle of operation is described when the person (persons) present in the commentator/interpreter room wants to communicate with a director in the direction room. For that purpose, e.g., the microphone 214 and the speaker 216 in the commentator/interpreter room are used and the microphone 412 and the speaker 414 in the direction room.

By pushing the intercom button INT 410, this communication connection is enabled, by closing the switches 450 and 452, by means of the control/mute signal 454. This control/mute signal 454 is also fed to the mute input 334 of the control module 220 and to the switches 420 and 422, for ensuring that they become opened (respectively stay open), by means of mute signals which are generated at the outputs 318 and 324 of the control module 220, and supplied through lines 415 and 417 to the control inputs of the switches 420 and 422. Now, the persons in the interpreter/commentator room and in the direction room can communicate with each other via the lines 456 and 458.

Is should be noted here that the invention is not limited to the exemplary embodiment shown. The invention is merely limited to the exemplary embodiments as defined by the claims. Hence, in particular in the circuitry and in the control module 220, several modifications are possible without deviating from the circuit arrangement as claimed in the claims.

The invention claimed is:

1. A circuit arrangement for a control module in a commentator and/or simultaneous translation arrangement, wherein the circuit arrangement comprises:
   a first logical switching unit and a second logical switching unit,
   a first and a second actuator unit, with each a first and a second terminal,
   a first and a second output, a first and a second power line, and that the first terminal of the first actuator unit is coupled to the first power line, the second terminal of the first actuator unit is coupled to the second power line, the first terminal of the second actuator unit is coupled to the first power line, the second terminal of the second actuator unit is coupled to the second power line, the second terminal of the first actuator unit is coupled to a first clock input of the first logical switching unit, the second terminal of the second actuator unit is coupled to a first clock input of the second logical switching unit, a first output of the first logical switching unit is coupled to the first output, and a first output of the second logical switching unit is coupled to the second output, and wherein the second terminal of the first actuator unit is coupled to a second control input of the second logical switching unit, and the second terminal of the second actuator unit is coupled to a second control input of the first logical switching unit.

2. The circuit arrangement as claimed in claim 1, wherein the second terminal of the first actuator units coupled to the second power line via a first impedance circuit, and the second terminal of the second actuator unit is coupled to the second power line via a second impedance circuit.

3. The circuit arrangement as claimed in claim 1, wherein the first output of the first logical switching unit is coupled to the first output via a first semiconductor element, and the first output of the second logical switching unit is coupled to the second output via a second semiconductor element.

4. The circuit arrangement as claimed in claim 1, wherein the circuit arrangement is further provided with a third actuator unit having a first and a second terminal, the first terminal of the third actuator unit being coupled to the first power line and the second terminal of the third actuator unit being coupled to the second power line.

5. The circuit arrangement as claimed in claim 4, wherein the second terminals of the first and third actuator units are coupled to the second control input of the second logical switching unit via a first logical combination unit, and the second terminals of the second and third actuator units are coupled to the second control input of the first logical switching unit via a second logical combination unit.

6. The circuit arrangement as claimed in claim 3, wherein the circuit arrangement is further provided with a fourth actuator unit having a first and a second terminal, the first terminal of the fourth actuator unit being coupled to the first power line and the second terminal of the fourth actuator unit being coupled to the second power line.

7. The circuit arrangement as claimed in claim 6, wherein the first terminal of the fourth actuator unit and the first output of the first logical switching unit are coupled to an input of the first semiconductor element via a third logical combination unit, and the first terminal of the fourth actuator unit and the first output of the second logical switching unit are coupled to an input of the second semiconductor element via a fourth logical combination unit.

8. The circuit arrangement as claimed in claim 1, wherein the first and second logical switching units are S-R Flip-flops.

9. The circuit arrangement as claimed in claim 3, wherein the first and second semiconductor elements are NPN-transistors.

10. The circuit arrangement as claimed in claim 5, wherein the logical combination units are AND-gates.

11. The circuit arrangement as claimed in claim 4, wherein, the third actuator unit is in the form of a two-position switch, and that in a first position of the two-position switch, a commentator function is switched in, and in the other position of the two-position switch, a simultaneous translator function is switched in.

12. The circuit arrangement as claimed in claim 6, wherein the fourth actuator unit is a mute switch.

13. The circuit arrangement as claimed in claim 12, wherein it is provided with a control input, which control input is coupled the first terminal of the fourth actuator unit.

14. A control module provided with the circuit arrangement as claimed in claim 1, wherein it is provided with at least two actuator pushbuttons, each being mechanically coupled with the first and second actuator unit, respectively.

15. The control module as claimed in claim 14, wherein it is further provided with a third actuator pushbutton which is mechanically coupled with the fourth actuator unit.

16. A commentator and/or simultaneous translation arrangement, comprising an audio mixer console, an intercom panel and a control module, wherein the control module is a control module as claimed in claim 14.

17. The commentator and/or simultaneous translation arrangement as claimed in claim 16, comprising an audio mixer console, an intercom panel and a control module, wherein a connection comprising at least four conductors is provided between the control module and the control- and speech unit, the connection being devoid of audio conductors.

18. The commentator and/or simultaneous translation arrangement as claimed in claim 17, wherein the connection comprises five conductors: two power conductors, a mute signal conductor and two switch signal conductors.

19. The commentator- and/or simultaneous translation arrangement as claimed in claim 16, comprising an audio mixer console, an intercom panel and a control module, wherein the audio mixer console is provided with a signal input for directly connecting of a microphone of a commentator or a translator with the audio mixer unit.

20. The commentator and/or simultaneous translation arrangement as claimed in claim 19, wherein the intercom panel is provided with a signal output for connecting a headphone of the commentator or translator.

21. The commentator and/or simultaneous translation arrangement as claimed in claim 19, wherein the audio mixer unit is provided with a first and a second controllable switching unit, that the signal input of the audio mixer console is coupled to a first terminal of the first controllable switching unit and to a first terminal of the second controllable switching unit, that a second terminal of the first controllable switching unit is coupled to a first output terminal of the audio mixer console and a second terminal of the second controllable switching unit is coupled to a second output terminal of the audio mixer unit.

22. The commentator and/or simultaneous translation arrangement as claimed in claim 21, wherein the first output terminal of the control module is coupled to a control input of the first controllable switching unit of the audio mixer unit, and the second output terminal of the control module is coupled to a control input of the second controllable switching unit of the audio mixer unit.

23. The commentator and/or simultaneous translation arrangement as claimed in claim 21, wherein the first output terminal is coupled to a headphone for a person being interviewed.

24. The commentator and/or simultaneous translation arrangement as claimed in claim 21, wherein the second output terminal is coupled to a broadcast transmitter arrangement.

25. The commentator and/or simultaneous translation arrangement as claimed in claim 16, wherein the control module is provided with a first and a second output terminal for supplying a first and a second control signal and with a control input, for receiving an external mute signal, which first and second output terminals are coupled to a first and a second input of the intercom panel, respectively, and which control input is coupled to a control signal output of the intercom panel.

* * * * *